March 29, 1932.  G. K. JESSUP  1,851,435
THREADING CABLES THROUGH DUCTS
Filed Oct. 22, 1927
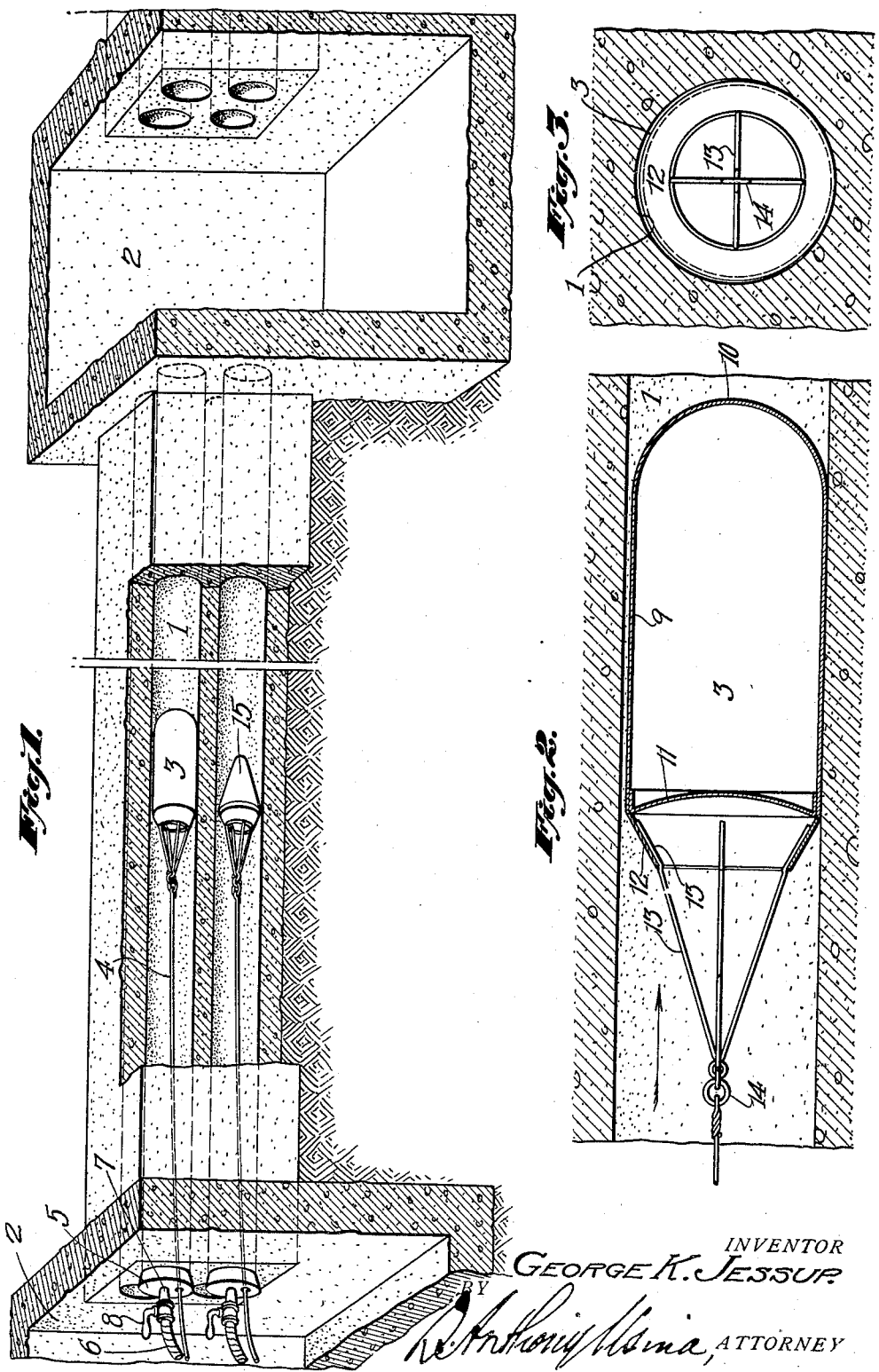
INVENTOR
GEORGE K. JESSUP
BY
R. Anthony Usina, ATTORNEY Patented Mar. 29, 1932

1,851,435

UNITED STATES PATENT OFFICE

GEORGE K. JESSUP, OF GREENWICH, CONNECTICUT, ASSIGNOR, BY MESNE ASSIGNMENTS, TO METROPOLITAN DEVICE CORPORATION, A CORPORATION OF NEW YORK

THREADING CABLES THROUGH DUCTS

Application filed October 22, 1927. Serial No. 228,093.

The invention provides a method and a device of very simple construction by which a cord can be threaded through an underground duct from one manhole to another in an instant and which is applicable to use in similar operations in other situations.

The accompanying drawings illustrate embodiments of the invention.

Fig. 1 is a perspective partly in section of a bank of ducts between two manholes;

Fig. 2 is a vertical section of a lead-in in place;

Fig. 3 is an end view of the same.

In Fig. 1 two straight ducts 1 are shown in section extending between manholes 2. A lead-in 3 has a cord 4 attached to its rear end, trailing through a hole in the lower part of a plug 5 which is inserted in the left end of the duct. An air hose 6 connected with a source of compressed air has a nozzle 7 passing through a hole in the center of the plug and is provided with a cock 8.

Initially the lead-in 3 is placed in the duct with its rear end at the manhole, the cord is threaded through the plug and fastened to the lead-in and the plug introduced into the end of the duct. The nozzle is then pushed into the central hole in the plug and the cock 8 opened. The air propels the lead-in through the duct and into the far manhole very quickly, in a fraction of a second in one test.

The plug is then removed and the cable attached to the cord and pulled through the duct. Where a light cable and a straight duct are involved, the cable may take the place of the cord, being attached directly to the lead-in and being drawn by the latter through the duct. Or the cord may be used to pull a heavier cord or rope through the duct, and the rope used to pull a heavy cable through.

To secure ease and quickness of operation the lead-in is made very light. The example in Fig. 2 has its body portion made of a thin cylindrical shell 9 of copper with a pointed or rounded forward end 10 and with a concave plate or sealing disc 11 soldered to its rear end. To this in turn is soldered a cone 12 to which are soldered rods 13 converging toward the rear and carrying a ring 14 for attachment of the cord, rope or cable.

The entire device is light enough to float on any water which may be in the duct. It approximately fits the duct, leaving clearance enough to insure easy movement under the pressure of air behind it. It may be made so light as to be propelled rapidly by the air even without the plug 5 in the rear end of the duct.

It is essential that any substantial pressure of air be built up behind the lead-in. The opening in the plug 5 through which the cord 4 runs is large enough to permit free movement of the cord and also to permit the escape of much of the air blown into the duct, and the space around the piston, as shown in Figs. 2 and 3, is made so great (to ensure perfect freedom of travel) that a large quantity of air can escape from the rear to the front of the device. Nevertheless, the whole device is so light that it can be forced easily and very quickly through the duct by a current of air. I am aware that devices for achieving similar purposes have been made with expansible parts to secure a close fit and permit the accumulation of air or water pressure behind them to force them like a tight piston through the pipe or duct. But in such devices, there has been no substantial reason for restricting the weight. The pressure behind them has been sufficient to carry them along regardless of the weight or the frictional engagement with the tube. With my device it is the combination of particularly light weight and fixed cross-section fitting loosely within the duct which permits the very quick passage of the lead-in by the simple expedient of introducing a current of air behind it without accumulation of any substantial pressure.

Various other shapes and constructions of the lead-in may be provided. In Fig. 1, I have shown a lead-in 15 of similar construction to that above described but having the cylindrical portion nearly or entirely eliminated; that is with its converging front and rear portions united at their bases directly or approximately so. This shape is particularly designed for ducts which have a curve in their length which it would be difficult to force an elongated cylinder through.

Various other shapes can be designed of the same loose piston character designed to be propelled freely through a duct by fluid pressure at the rear.

Various other modifications may be made by those skilled in the art without departing from the invention as defined in the following claims:

What I claim is:

1. A lead-in for threading cables through ducts comprising a piston of fixed cross-section fitting loosely within the duct and permitting the passage of air between it and the duct, said piston being of such light weight that it can be forced through the duct quickly by a current of air and in free suspension in air, and means for attaching a cord to said piston.

2. A lead-in for threading cables through ducts comprising a piston of fixed cross-section fitting loosely within the duct and permitting the passage of air between it and the duct, said piston being of such light weight that it can be forced through the duct quickly by a current of air and in free suspension in air, said piston being hollow and converging at both ends and means for attaching a cord to said piston.

3. A method of propelling a lead-in through a conduit which comprises floating said lead-in within, and out of contact with, the inner wall surface of said conduit by means of a moving layer of air therebetween and creating a difference in pneumatic pressure on the opposite ends of said lead-in, the pressure being less towards the direction of travel of said lead-in.

4. A method of propelling a lead-in through a conduit which comprises moving a layer of air between the lead-in and the inner surface of said conduit to float said lead-in out of contact with the walls of said conduit, and forcing air against one end of said lead-in to propel it through said conduit.

In witness whereof, I have hereunto signed my name.

GEORGE K. JESSUP.